United States Patent [19]

Andes et al.

[11] Patent Number: 5,075,868

[45] Date of Patent: Dec. 24, 1991

[54] MEMORY MODIFICATION OF ARTIFICIAL NEURAL NETWORKS

[75] Inventors: David K. Andes; Robert A. Licklider; Donald H. Witcher; Richard M. Swenson; James F. Barbieri, all of Ridgecrest, Calif.

[73] Assignee: The United States of America as represented by the Secretary of the Navy, Washington, D.C.

[21] Appl. No.: 410,373

[22] Filed: Sep. 18, 1989

[51] Int. Cl.$^5$ .............................................. G06F 15/46
[52] U.S. Cl. .......................................... 395/23; 377/2; 395/24
[58] Field of Search ...................... 364/513, 807; 377/2

[56] References Cited

U.S. PATENT DOCUMENTS

| | | | |
|---|---|---|---|
| 4,660,166 | 4/1987 | Hopfield | 364/807 |
| 4,719,591 | 1/1988 | Hopfield et al. | 364/807 |
| 4,755,963 | 7/1988 | Denker et al. | 364/807 |

OTHER PUBLICATIONS

Widrow, B. and Hoff, M. E.; "Adaptive Switching Circuits", *Institute of Radio Engineers, Western Electric Show and Convention, Convention Record*, Part 4, pp. 96-104 (1960).

Widrow, B., Winter, R. G., and Baxter, R. A.; "Learning Phenomena in Layered Networks", *IEEE First International Conference on Neural Networks*, (Sep. 1988).

Rumelhart, D. E., Hinton, G. E., and Williams, R. J.; "Learning Internal Representations by Error Propagation", *Parallel Distributed Processing*, Chap. 8, pp. 318-328, The MIT Press, Cambridge, Mass. (1986).

IEEE First International Conference on Neural Networks, San Diego, Calif. 21-24 Jun. 1987, IEEE, A. G. Barto et al.: "Gradient Following Without Back--Propagation in Layered Networks", pp. II/629-636; see p. 629, ln 1 to p. 631 line 20.

Journal of Elct. Eng. vol. 25, No. 256, Apr. 1988 (Tokyo, JP), "Disturbance Generator Improves Recognition in Neuron Computers", pp. 74-77; see p. 75, left--hand column, line 33 to right-hand column, line 8.

IEEE ASSP Magazine, Apr. 1987, IEEE, R. O, Lippman: "An Introduction to Computing with Neural Nets", pp. 4-22.

*Primary Examiner*—Michael R. Fleming
*Assistant Examiner*—George Davis
*Attorney, Agent, or Firm*—Stephen J. Church; Melvin J. Sliwka; Sol Sheinbein

[57] ABSTRACT

An artificial neural network, which has a plurality of neurons each receiving a plurality of inputs whose effect is determined by adjust able weights at synapses individually connecting the inputs to the neuron to provide a sum signal to a sigmoidal function generator determining the output of the neuron, undergoes memory modification by a steepest-descent method in which individual variations in the outputs of the neurons are successively generated by small perturbations imposed on the sum signals. As each variation is generated on the output of a neuron, an overall error of all the neuron outputs in relation to their desired values is measured and compared to this error prior to the perturbation. The difference in these errors, with adjustments which may be changed as the neuron outputs converge toward their desired values, is used to modify each weight of the neuron presently subjected to the perturbation.

10 Claims, 5 Drawing Sheets

MEMORY MODIFICATION OF ARTIFICIAL NEURAL NETWORKS

BACKGROUND OF THE INVENTION

1. Field of the Invention

The present invention pertains to the field of pattern recognition. More particularly, the invention pertains to the field of adaptive pattern recognizers capable of supervised or unsupervised memory modification or learning.

2. Description of the Belated Art

Artificial neural networks having parallel, distributed processing are recognized as a way to provide extremely fast overall processing with relatively slow elements, pattern recognition by learning from prototypes with subsequent minimal functional degradation due to noisy inputs, and effective functioning despite deficient or inoperable elements, this last feature resulting in high yields in integrated circuits implement such networks. Accordingly, extensive theoretical research and digital simulations have been performed in connection with artificial neural networks. However, the practical application of these networks depends on the development of memory modification methods that are effective with practical and mass producible integrated circuits having vast numbers of elements functioning in parallel.

An artificial neural network contemplated by the prior art is depicted conceptually and conventionally in FIG. 1, and has three "neurons" 10, each providing an output 11 of the network, and four inputs 12, each connected to each neuron by a "synapse" 13. This network and others subsequently described herein are, to make exposition possible, much simpler than any practically useful artificial neural network integrated circuit having, for example, sixty-four neurons each with one hundred and twenty-eight inputs. The complexity of the memory modification arrangements described herein for an artificial neural network should, therefore, be considered as the network might be implemented with thousands of synapses rather than the twelve synapses in FIG. 1.

Each synapse 13 is depicted as having a variable resistor 15 to indicate that a signal, typically a voltage signal, on each input 12 provides a current to a summing circuit 16 of each neuron 10. This current is proportional to the strength of the input signal and a "weight" which is the conductance of the synapse as determined by resistor 15. The output of circuit 16 is provided to a function generator 18 which drives the corresponding output 11 in accordance with a predetermined relation or function between the sum of the input signals and a, typically voltage, output signal. It is well-known that by suitable adjustments to the weights, that is, modification of the "memory" of the network occurring when the memory "learns", the output signals may be made to assume desired values corresponding to predetermined values of the input signals. The value of an artificial neural network is thus dependent on the practicality of its arrangements for memory modification as embodied in an actual circuit It is contemplated that an artificial neural network, such as that of FIG. 1 but having many more elements as mentioned above, is utilized as only one "layer" of a more complex network in which the outputs, such as 11, of one layer are the inputs, such as 12, of a similar layer. The practicality of embodying an artificial neural network memory modification method in an integrated circuit thus depends on the connecting elements necessary between layers as well as on the connecting elements to the synapses, such as 13, of each layer. The complexity of the memory modification arrangements described herein for a one layer artificial neural network should, therefore, be considered with the network connected as one layer of several layers each with thousands of synapses. Typically, signals generated in accordance with such a method to modify the weights of an artificial neural network do not correspond to new values to be substituted for the existing values of the weights, but to linear changes to be added algebraically to such existing values. There are many well-known, as well as contemplated, circuits for so modifying such a weight and the particular such circuit employed in an artificial neural network embodying the present memory modification method or other such methods depends on many considerations including the manner of implementing the weights, which may be an actual variable resistance of any kind, a digitally switched circuit, a change in the gate charge of a field effect transistor, or some combination of such elements Accordingly, FIG. 1 depicts such weight modification circuits of each synapse 13 schematically and for representative purposes Each such circuit has a multiplier 20 having one input 21 from the network input 12 corresponding to the synapse since the weight modification is, typically, proportional to the degree of activation of the synapse input. Multiplier 20 has another input 22 for other factors, subsequentially described in detail, used to modify the synapse weight and provided from outside the network by a teaching system. It should be noted that inputs 12 may be provided to a teaching system, directly by bypassing the network or by multiplexing inputs 12, with the function of multiplier 20 performed by the teaching system and the results provided to the synapses corresponding to synapses 13 through multiplexing. The product output of multiplier 20 is provided to a setting circuit 24 of any suitable construction for adjusting the corresponding resistor 15 by an amount determined by the multiplier output.

The network of FIG. 1 is depicted, also schematically and for representative purposes, as having an error calculator 30 which receives the outputs 11 and also receives individually corresponding desired outputs 32 having values from which the network is to "learn". Each pair of corresponding outputs 11 and 32 is provided to a difference circuit 34 whose output represents the signed difference between the values of this pair and may be provided externally of the error calculator at a terminal 35.

Each difference is provided to a squaring circuit 36 which outputs to a summing circuit 37 which sums the squared differences and provides a corresponding signal to a square root circuit 38 whose output signal 39, typically termed simply "error", represents the overall error of the network. As determined in FIG. 1, signal 39 corresponds to the root-mean-square (RMS) of the individual neuron errors with the associated and well-known statistical and theoretical properties of the RMS error. However, an error calculator corresponding to calculator 30 may provide some other function corresponding to the absolute values of differences between each neuron output and its desired output.

Two well-known memory modification methods proposed for an artificial neural network are, first, the "delta rule" and, second, a method previously described in the prior art in connection with a multiple adaptive linear neuron or "Madeline" and, therefore, referred to herein as the "Madeline method". Both of these methods are the subject of extensive theoretical study and of digital simulation. In memory modification by these methods, the general approach is to provide the inputs of a network, which is adapted to use the method, with successive patterns and, at each presentation, to determine the errors between the values of such network output signals and their desired values. The errors are then used in accordance with the method to modify the weights.

The delta rule, which employs the well-known "steepest descent" technique, may be carried out by an artificial neural network constructed as shown in FIG. 2, this network being similar to that of FIG. 1 but having additional elements for implementing the delta rule. In regard to the similarities, the FIG. 2 network has three neurons 50 providing individual outputs 51 and receiving four inputs 52 to the network at four synapses 53 of each neuron with the synapse outputs being summed by circuits 55. The neuron outputs are provided to an error calculator 56 which receives three desired outputs 57 and provides three corresponding difference signals 58 and an overall error signal 59 available to a teaching system, not shown.

With the delta rule, the above mentioned function is necessarily differentiable and monotonically nondecreasing, and, typically, is a sigmoid or "S" shaped function as indicated by numeral 65 at three function generators 66 which correspond to function generators 18 and individually receive the outputs of circuits 55. In accordance with the delta rule, the FIG. 2 network is adapted for backpropagation through it of error signals derived from the errors between the desired network output signals and the learning output signals.

More specifically, the error signal corresponding to each neuron 50 is derived by a second function generator 70 thereof which receives the output of the summing circuit 55 and itself provides an output 71 corresponding to the derivative, indicated by numeral 72, of the sigmoidal function 65. The output 71 is, functionally, provided to a multiplier circuit 73 along with a backpropagated error signal 74, which may be from another artificial neural network layer, not shown, to which outputs 51 are propagated or, for a final such layer as shown in FIG. 2, may be the error signal 58 corresponding to the error between the neuron output 51 and a desired final output 57 of the network. The output of circuit 73, which thus combines the effect of the backpropagated error with the effect of a change in the contribution of the neuron 50, is typically multiplied, as represented by another multiplier circuit 75, by a teaching system provided gain signal 77, and the resulting product is transmitted as a signal on a conductor 78 to each synapse 53 of the neuron.

In each neuron 50, each synapse 53 has, similarly to FIG. 1, a variable weight or resistor 80 connecting an input conductor 81, which extends through all synapses corresponding to an input 52, to a summing conductor 82 which runs through all the synapses of the neuron to its summing circuit 55. Each synapse 53 also has a variable weight or resistor 83 connecting the corresponding conductor 78 to an error summing conductor 84, which extends through all the synapses corresponding to an input 52, to an error summing circuit 85, similar to a circuit 55, which corresponds to the input and provides an output 86 which is connected, in accordance with the delta rule, to a preceding artificial neural network layer as one of the backpropagated error signals 74.

At each synapse 53 the backpropagated signal on the corresponding conductor 78 is also provided to a multiplier 90 which corresponds to multiplier 20 in receiving the input signal corresponding to the synapse and in outputting to a setting circuit 91. Circuit 91 corresponds to circuit 24 and, in accordance with the delta rule, modifies both weights 80 and 83 at the same time proportionally to the product from multiplier 90.

It is apparent that a circuit implementing the delta rule is disadvantageous in its requirements of a substantial number of backpropagation connections and of the comparatively bulky and power consuming additional elements required for the additional function generator 70 of each neuron 50 and additional variable weight 83 of each synapse 53. A further serious disadvantage of the delta rule is that, although an artificial neural network can, in general, "learn around" a deficient or inoperative synapse or function generator, simulations have shown that the backpropagated delta rule error signals, such as those on conductors 78 and 81 and from output 86, must substantially attain a value representing zero error for convergence during memory modification by the delta rule. However, typical errors in the order of one percent in such signals due to presently attainable tolerances in the construction of the very large scale integrated circuit (VLSIC) necessary for practical application of artificial neural networks, are, as shown by such simulations, sufficient to prevent the degree of convergence required for many applications of artificial neural networks. The backpropagation required by the delta rule is also highly disadvantageous due to possible crosstalk between forwardly propagated signals and the backpropagated error signals which are of low magnitude as convergence is approached. It is apparent from FIG. 2 that pairs of conductors for these signals, such as the pair 78 and 82 and the pair 81 and 84, are adjacent in an actual integrated circuit as well as conceptually and cannot be spaced apart without limiting the number of neurons that can be constructed on one VHLIC. Crosstalk between back and forward propagated signals may also occur between neural network layers due to the proximity of signals to inputs 52 and from error signal outputs 86.

The proposed prior art Madeline memory modification method may be implemented by an artificial neural network and associated teaching elements constructed as shown in FIG. 3, the depicted arrangement of the network and teaching elements being conceptual since it is believed that no such network or teaching arrangement suitable for integrated circuit implementation has been constructed. The FIG. 3 network is similar to that of FIG. 1, but has additional elements for implementing Madeline memory modification. In regard to the similarities, the FIG. 3 network has three neurons 100 providing individual outputs 101 and receiving four inputs 102 to the network at four synapses 103 of each neuron with output signals of the synapses being summed by a circuit 104 and provided to a function generator 105. The neuron outputs are provided to an error calculator 106 which receives three desired outputs 107 and provides an overall error signal 109.

The network of FIG. 3, for each synapse 103 and similarly to the FIG. 1 network, a variable weight 110 adjusted by a setting circuit 111 in accordance with the product from a multiplier 112 of the corresponding input 102 and a variation signal, this latter signal being provided to the synapses of each neuron 100 by a conductor 115 extending through these synapses. Each neuron also has a summing conductor 117 extending through the synapses thereof and connecting the weights 110 of these synapses to the summing circuit 104 of the neuron.

The network of FIG. 3 has a multiplexer 120 receiving an address signal 121 and providing select signals 122 individually to the neurons 100. The network has a weight modification signal input 125 and a perturbation signal input 127 individually provided to each neuron through a pair of switches 128, which close on the signal 122 for the neuron, and connect the perturbation signal to the summing conductor 117 of the neuron and to connect the variation conductor 115 to the modification signal input 125.

In the network of FIG. 3, the function provided by each generator 105 is, in accordance with the Madeline method, a non-differentiable "signum" or step function, which is indicated by numeral 130 and implies that the output of each neuron 100 can only be in either one of two states, typically, the binary states of completely on or completely off. The neuron output thus undergoes a sudden transition or "flipping" between the two states at some level of output from the summing circuit 104 of the neuron.

In each cycle of learning by this method, it is necessary to determine the one of the neurons 100 in the network having the input to the function generator 105 of the neuron from the corresponding summing circuit 104 such that this generator is the one in the network nearest to flipping. The weights of this neuron are then adjusted and the cycle is repeated. It is known to implement the Madeline method by, first, perturbing the current to the summing circuits 104 one at a time to determine this one neuron. Second, the overall error of the network is determined before and after such a perturbation in current to a selected summing circuit. Third, if this overall error is decreased by the perturbation, the weights of the perturbed neuron are adjusted by an amount proportional to the reduction in error. The Madeline method may also involve finding several neurons closest to flipping and then perturbing those neurons.

The Madeline method appears deficient, as shown by simulations attempting recognition of relatively complex patterns with multiple layer artificial neural networks, in that convergence to only a relatively large error is possible. To some extent, this is believed due to the large output shift occurring with the signum function 130. However with complex patterns and multiple layers, simulations directly substituting the sigmoid function 65 of FIG. 2 for signum 130 and using the Madeline approach of finding a neuron or neurons closest to changing and then perturbing these neurons also does not converge to as small an error as is possible with memory modification using the above-mentioned steepest descent technique implemented by delta rule simulation.

It is apparent that an integrated artificial neural network embodying the Madeline method would, as shown in FIG. 3, be complicated by the need to bring out from the network signals corresponding to the currents from each of the summing circuits 104 for measurement to determine which neurons are nearest to changing. The necessary scanning and comparison of the neurons, such as neurons 100, to detect the one or a few thereof nearest to changing would also be relatively time consuming and require relatively complex arrangements suggested in FIG. 3 where, at each neuron, the corresponding select signal 122 is provided to a switch 135 which is closed by this signal so as to connect the output of the summing circuit 104 to a conductor 136 providing this output externally of the FIG. 3 network.

The arrangements for Madeline memory modification suggested in FIG. 3 also include a controller 140 represented as a labeled rectangle and providing a search period signal 141, a perturb period signal 142, an adjust period signal 143, and a save signal 144 which are exerted sequentially during a memory modification cycle as depicted on the rectangle. Error signal 109 is provided to a buffer 145 which is loaded by signal 144 at the end of each cycle and thus retains the error for the next cycle. A difference circuit 147 receives this retained error and signal 109 and provides a signal 148 representing the change in error or "delta error". Error signal 109 may be provided externally and may be compared with an externally provided desired error signal 151 to generate a signal 153 which causes controller 140 to run when the error is less than the desired error. To control memory modification, a signal 155 controlling the amount of gain and a signal 156 controlling the amount of perturbation are externally provided. The product of gain signal 155 and delta error signal 148 is divided by perturb signal 156 to provide a weight variation signal 158. Perturb amount signal 156 is provided to the FIG. 3 network as signal 127 by a switch 161, which is closed by perturb period signal 142, and by a current generator 162 which converts this signal to a current level appropriate for the summing circuits 104. Signal 158 is provided to the network as signal 125 by a switch 163 closed by adjust period signal 143.

Elements similar to those described in the previous paragraph may be useful for other memory modification methods than the Madeline method; however, the search for a neuron nearest to changing is unique to the Madeline method and if implemented in hardware requires elements similar to those now to be described with reference to FIG. 3. During the search period defined by signal 141, a counter 165, whose output is directed to the network as signal 121 by a multiplexer 166, successively addresses neurons 100. The outputs of summing circuits 104 are thus delivered successively by switches 135 and through conductor 136 to an absolute difference circuit 167 which receives an external signal 168 corresponding to the input level of function generator 105 at which transition of the output thereof occurs. (In practice the tolerances in VLSIC construction and operation are such that the actual transition input level may not be known, requiring iterative variation in signal 168 with examination of the output of function generator 105 at each iteration to determine whether transition has occurred.) The difference between signal 168 and the output of circuit 104 of an addressed neuron 100 is provided to a buffer 170 which is loaded by a signal 172 from comparator 173 whenever such a difference is lesser than a previous such difference stored in buffer 170. Signal 172 is also provided to load an address buffer 175 with the address, from counter 165, of the neuron having such lesser difference. When the search period is over, buffer 175 by way of multiplexer 166 addresses the neuron nearest to transition during the following perturbation and weight adjustment periods.

It is evident from comparison of FIG. 2 with FIG. 3 that the Madeline method, FIG. 3, avoids the delta rule, FIG. 2, backpropagation of error signals at the expense of arrangements, as suggested by the description in the previous paragraph, for determining, in an artificial network having signum function generators, the neuron or neurons nearest to transition. However, because of the before stated difficulties in convergence, the Madeline method is not an effective alternative for many proposed applications of artificial neural networks. It is, therefore, apparent that an artificial neural network memory modification method which provides convergence to minimal error, which is effective with multiple layer neural networks, and which can be effectively implemented with VLSI techniques without excessive bulk and expense would be highly advantageous.

SUMMARY OF THE INVENTION

Memory modification of an artificial neural network having a plurality of neurons with each neuron receiving a plurality of inputs whose effect is determined by adjustable weights at synapses individually connecting the inputs to the neuron to provide a sum signal from which the output of the neuron is determined by a sigmoidal function. The network learns by a steepest-descent method in which variations in the outputs of the neurons are generated by small perturbations imposed on the sum signals individually and in succession without regard to the unperturbed values of the sum signal or sigmoidal function output. As each variation is generated on the output of a neuron, an overall error, such as the root-mean-square error, of all the neuron outputs in relation to their desired values is measured and compared to this error prior to the variation. The difference in these errors, as modified by a gain factor is, depending on the direction of error change due to the variation, added to or subtracted from each weight of the neuron presently undergoing the variation. If the effect of a perturbation is less than a predetermined threshold, training time may be saved by omitting the weight modification corresponding to the perturbation. The perturbation, such threshold, and the gain factor may be decreased as the neuron outputs approach their desired values.

An object of the present invention is to provide effective memory modification for learning in an artificial neural network implemented by parallel processing.

Another object is to provide such memory modification particular adapted for use with such processing by a very large scale integrated circuit.

Still another object is to provide such memory modification for rapid adjustment of artificial neural network weights for minimal error.

A further object is to, provide such memory modification which is fully effective in artificial neural networks having a plurality of layers.

BRIEF DESCRIPTION OF THE DRAWINGS

Other objects, advantages, and novel features of the present invention will become apparent from the following detailed description when considered with the accompanying drawings in which.

DESCRIPTION OF THE PREFERRED EMBODIMENT

Figure 4:
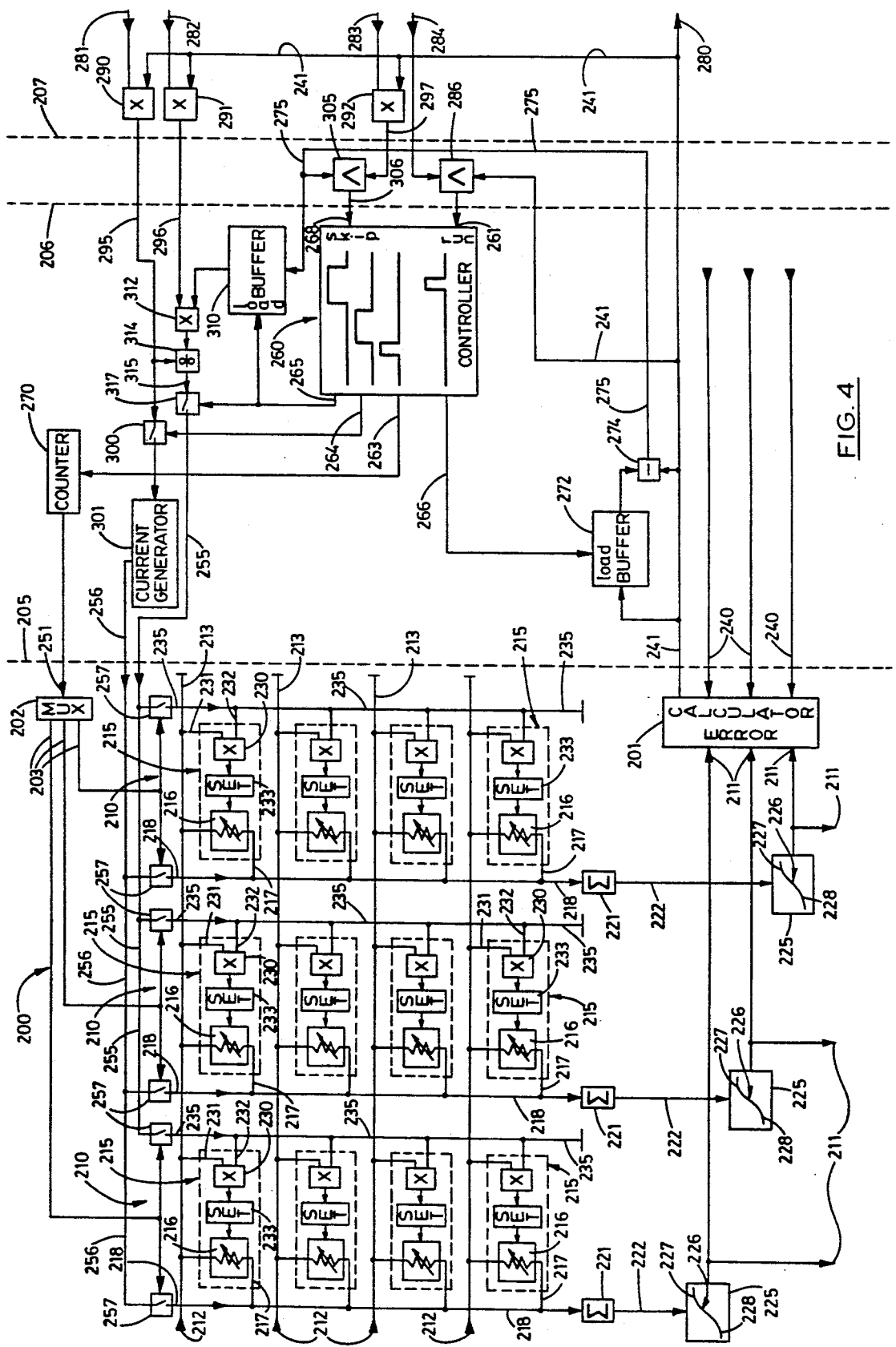
FIG. 4 is a block diagram of an artificial neural network system adapted for memory modification in accordance with the present invention.
Figure 5:
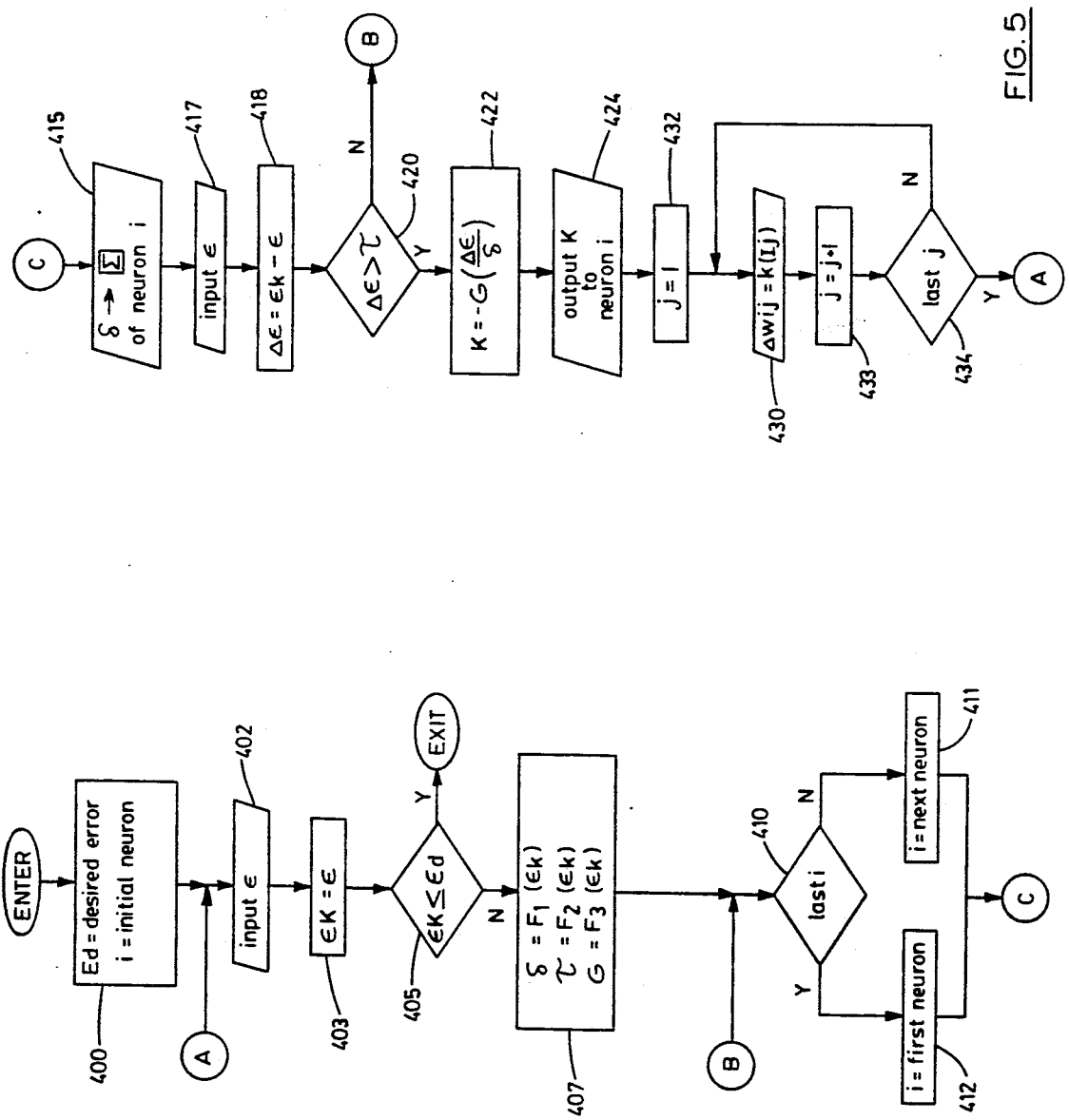
FIG. 5 is a flow diagram of artificial network memory modification in accordance with the present invention.

The features of the present invention will be apparent from FIG. 4, which shows an artificial neural network system adapted for memory modification in accordance with the present invention, and from FIG. 5 which is a flow chart of a method of memory modification in accordance with the present invention.

In these Figures and in the following description:

$\epsilon$ is the overall error of the outputs of an artificial neural network in relation to desired such outputs, $\epsilon_d$ is a desired level of such error, $\Delta,\epsilon$ is the change in such error due to a perturbation of the network for memory modification thereof, $\tau$ is an error change threshold level, k is a subscript identifying the current iteration or cycle of memory modification, $\epsilon_k$ is the initial value of such error for a current iteration, $\delta$ is the level of a perturbation signal for the summing circuit of a neuron of the network during an iteration, i is a subscript identifying a neuron or column of the network, j is a subscript identifying an input or row of the network, $O_i$ is an output signal of neuron$_i$, $D_i$ is a desired output signal of neuron$_i$, $I_j$ is the input to synapses$_j$, $\Delta w_{ij}$ is an adjustment or weight change to synapse$_i$ of neuron$_j$, and K is a correction signal for the weights of a neuron.

Figure 1:
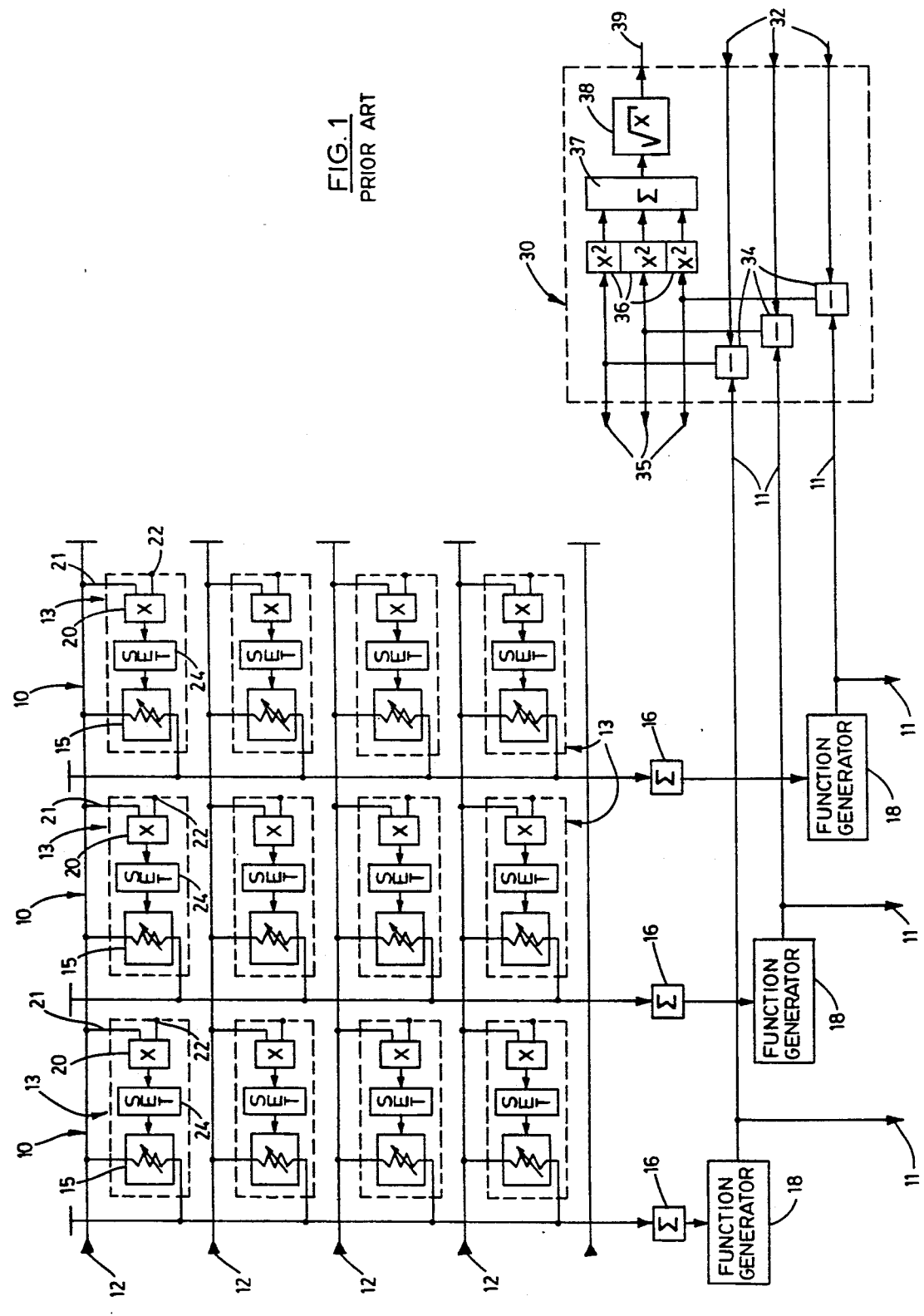
FIG. 1 is a block diagram of a generalized artificial neural network as contemplated by the prior art and with representative elements for memory modification.
Figure 3:
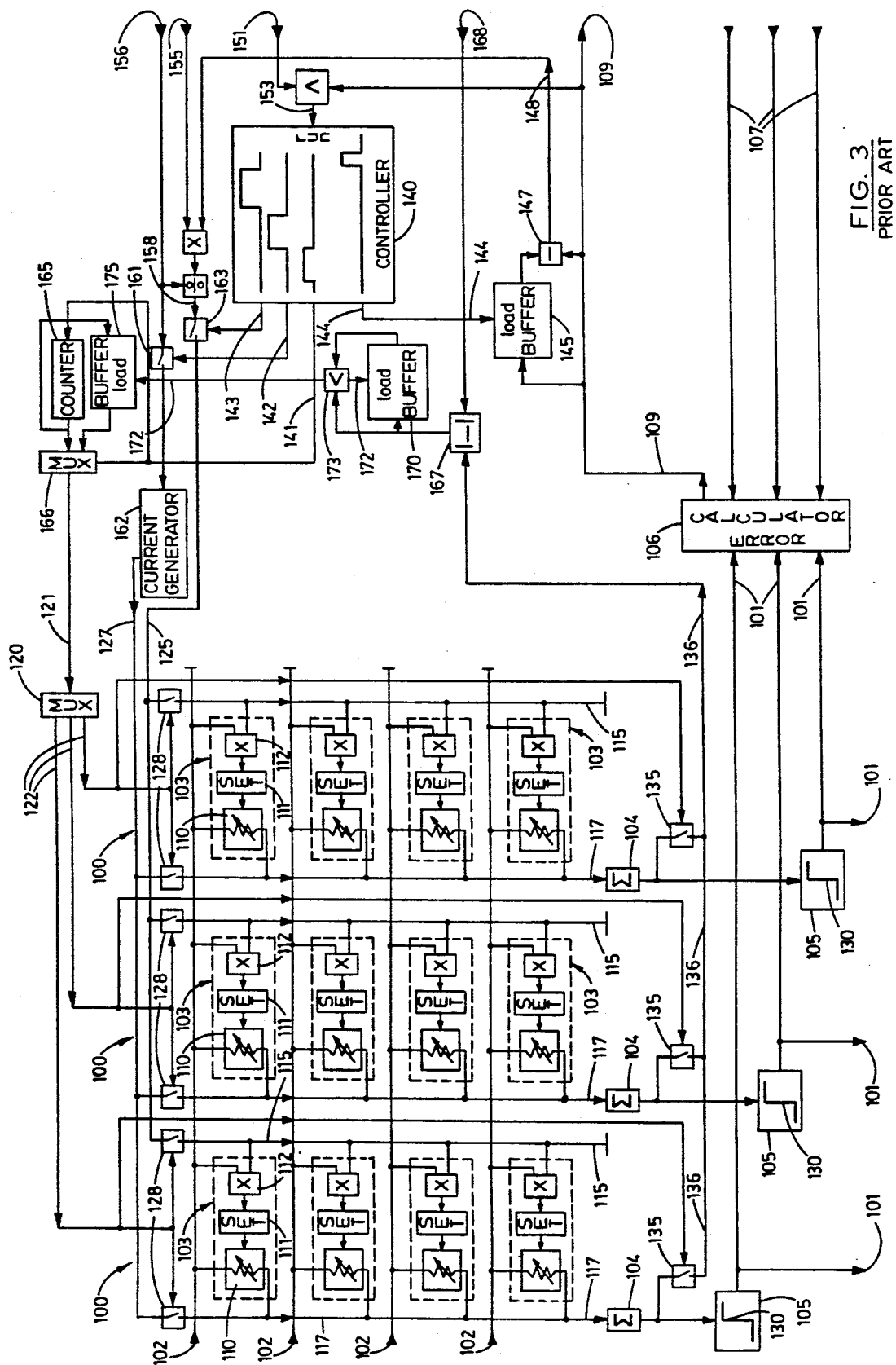
FIG. 3 is a block diagram of an artificial neural network system adapted for memory modification by the prior art Madeline method.

The system of FIG. 4 has an artificial neural network 200 similar to that of prior art FIGS. 1 or 3 in having an associated error calculator 201 and a neuron multiplexer 202 providing select signals 203. The system also has teaching elements for memory modification of the network in accordance with the present invention. Required such elements, which correspond to certain of the elements required for Madeline memory modification, are depicted between dash lines 205 and 206. Other elements providing features of the present invention, which are not required for the practice of the present invention in its broadest aspect but which are highly advantageous, are depicted in FIG. 4 to the right of line 206. The elements depicted between dash lines 206 and 207 provide such a feature which expedites memory modification, and the elements to the right of line 207 provide features which facilitate convergence during memory modification.

Network 200 is depicted as having three neurons 210, each having an output 211 providing a signal "O$_i$", and as having four inputs 212 providing a input signal "I$_j$". Network 200 typically serves as on layer of multiple layer artificial neural network in which outputs 211 may be provided to a following and similar artificial neural network layer, and inputs 212 may be received from such a layer. Network 200 has four input conductors 213 extending through the neurons individually from inputs 212 to provide the input signal to the neurons, this signal being connected to each neuron through a synapse 215 thereof. Each synapse 215 is depicted as having a variable resistor 216 to indicate that the signal, typically a voltage signal, on each input 212 provides a current or synapse output signal 217 via a summing conductor 218 of the neuron to a summing circuit 221 thereof. Current 217 is proportional to the product of the signal level o activation of the input signal and a weight which is the conductance of the synapse as determined by resistor 216. The output of summing circuit 221 is a sum signal 222 representing the sum of the synapse output signals 217 of the neuron.

Each neuron 210 has a function generator 225 which receives the sum signal 222 and drives an output signal on the corresponding output 211 in accordance with a predetermined function, which is indicated by numeral 226, between the sum signal and a signal on the output, typically a voltage signal corresponding to that on inputs 212. Function 226 provides an upper bound 227 and a lower bound 228 for the output signal and is, substantially, a function defined in mathematical terms as a differentiable and monotonically nondecreasing function. That is, the function has no portion such as the step of the signum function 130 of FIG. 3 where the rate of change of the function is substantially infinite, has only one output value for each input value, and has output values which increase continually with increasing input values. Function 226 is, preferably, a sigmoid or "S" shaped function.

Each synapse 215 of network 200 has representative and schematically depicted elements for modifying the weights provided by the corresponding resistors 216. These elements include a multiplier 230 having one input 231 connected to the corresponding conductor from the network input 212 corresponding to the synapse and having another input 232 for a variation signal "K" representing other factors involved in adjustment of the synapse weight. The product output of multiplier 230 is provided to a setting circuit 233 of any suitable construction for adjusting the corresponding resistor 216 by an amount "$W_{ij}$" determined by the multiplier output. Each neuron 210 has a variation signal conductor 235 extending through the synapses 215 of the neuron and connected at each synapse to the multiplier input 232 thereof to provide thereto the above mentioned variation signal which, as subsequentially described in detail, is generated by the teaching elements to the right of line 205.

Inputs 212 may be provided directly to a teaching system, which is for practicing the method of the present invention, by bypassing a network similar to network 200 or by multiplexing inputs 212 from the network. The function of multiplier 230 and other operations required by the method of the present invention may be performed digitally by such a teaching system and the results therefrom, which are required to modify synapse weights corresponding to resistors 216, provided to synapses, which correspond to synapses 215, through multiplexing directly to the synapses. When a method embodying the present invention is carried out in this or a related manner involving similar multiplexing and digitally performed operations, such a training system may consist substantially of a digital computer programmed in accordance with FIG. 5.

Network 200 is depicted, also schematically and for representative purposes, as having error calculator 201 to, in any suitable manner such as that previously described in connection with calculator 30 of FIG. 1, receive outputs 211 and individually corresponding desired outputs 240 providing signals "$D_j$" and generate an error signal "$\epsilon$", identified by numeral 241, which indicates the overall error of the network as represented by the root-mean-square of the individual neuron errors. However, the calculation of such overall error for the purposes of the present invention may utilize some other function corresponding to the absolute values of the differences between the output of each neuron output and its desired output. The error calculation may be performed by a digital computer which directly receives outputs 211 and desired outputs 240 and which also performs the operations identified in the previous paragraph as being performed by such a computer.

Neuron address multiplexer 202 receives an address signal 251 and provides a select signal 203 to the one of the neurons 210 addressed by the address signal. The network has a variation signal input 255 and a perturbation signal input 256 selectively connectable to each neuron through a pair of switches 257 thereof which are closed by the corresponding signal 202. One switch 257 connects the variation signal input 255 to the variation conductor 235 of the neuron and serves to adjust the weights thereof, which are represented by resistors 216, when the neuron is selected by the corresponding signal 252. The other switch 257 connects the summing conductor 218 to the perturbation signal input 256 and serves to provide the summing circuit 221 with current provided on input 256 as perturbation signal "$\delta$" and thus change the sum signal 222 of the neuron when the neuron is selected by the corresponding signal 203. It is evident that the pair of switches 257 of each neuron, together with multiplexer 202, serve to selectively address the summing circuits 221 and, when each summing circuit is addressed, address the resistors 216 corresponding to the summing circuit.

The teaching elements for network 200 depicted to the right of line 205 are representative of elements for carrying out a method which embodies the present invention and is generally in accordance with the flow chart of FIG. 5. These elements include a controller 260 which runs when a terminal 261 is energized to carry out repeated teaching cycles each defined by successive signals from the controller, namely an increment pulse 263, a perturb period signal 264, an adjust period signal 265, and a save pulse 266. Signal 265 and pulse 266 are suppressed when a skip terminal 268 of the controller is energized.

At the start of each cycle, pulse 263 is provided to a neuron address counter 270 to address via multiplexer 202 a different one of the neurons 210 than was addressed at the previous cycle. The neurons are thus addressed successively; that is, one at a time. However, in the practice of the present invention the neurons need not be addressed in any particular sequence and may be addressed randomly. At the end of each cycle when pulse 266 is generated, this pulse is provided to a buffer 272 which saves, for use as $\epsilon_k$, the error signal 241 representing the error $\epsilon$ of network 200 after any adjustments to the weights 216 performed during the cycle. The output of buffer 272 is provided to any suitable difference circuit 274 together with signal 241 so that circuit 274 provides a signal 275 representing the error change $\Delta\epsilon$ due to perturbation $\delta$ of a sum signal 222 in the current cycle.

Signal 241 is, typically, provided at an external terminal 280 of the FIG. 4 system for use in monitoring memory modification of the system by an overall teaching controller, not shown, which may provide signals representing patterns to be learned to inputs 212 and provide corresponding desired outputs 240. Such an overall controller may also provide to the system a base perturb signal at a terminal 281, a base gain signal at a terminal 282, a base error threshold signal at a terminal 283, and a desired error signal $\epsilon_d$ at a terminal 284. Terminal 284 is connected to a comparator 286 which also receives error signal 241 and which generates an output to controller run terminal 261 when the desired error is less than the error $\epsilon$ so that memory modification of network 200 continues until the desired error is attained.

The signals at terminals 281-283 are provided individually to corresponding multipliers 290-292 which also receive error signal 241 to generate respective product signals 295-297 so that signal 295 corresponds to the perturbation level $\delta$ as a function of the level of error 68, signal 296 corresponds to the gain G as a function of error level $\epsilon$, and signal 297 corresponds to the error threshold level $\tau$ as a function of error level $\epsilon$.

Perturbation signal 295 is provided through a switch 300, which is closed by perturb period signal 264 following the initiation of a memory modification cycle by pulse 263, to a current generator 301 which provides a perturbation current which corresponds to level $\delta$, to network input 256. This current is conducted, by the appropriate switch 257 of the one of the neurons 210 currently addressed by counter 270 and multiplexer 202, to the summing conductor 218 of the addressed neuron and thus to the summing circuit 221 thereof so as to change the sum signal 222 from this circuit as a result of the perturbation level $\delta$ predetermined by error level $\epsilon$ and the base perturbation signal to terminal 281. It will be apparent that every one of the sum signals 222 will be changed as the neurons 210 are successively so addressed. It will also be apparent that, as each such sum signal change occurs, the effect thereof is propagated to the corresponding function generator 225 and to error calculator 201 to generate an error output 241 thereof a trial signal for error $\epsilon$. Since no adjustment to variable resistors 216 has yet occurred during the current memory modification cycle, this trial error signal is determined by the weights corresponding to the settings of these resistors resulting in the error signal retained by pulse 266 in buffer 272 at the end of the previous memory modification cycle.

At this time, the $\Delta\epsilon$ signal 275 determined by the trial error signal on error calculator output 241 and the error $\epsilon_k$ is provided to a comparator 305 which also receives the threshold signal $\tau$ 297 and which provides a skip adjustment signal 306 to terminal 268 of controller 260 whenever the $\Delta\epsilon$ error signal is not greater than the threshold signal. When skip signal 306 is asserted, controller 260 thus provides pulse 263 immediately following perturb period signal 264 to initiate the next memory modification cycle without any adjustment during the current cycle of a weight of a synapse 215 as represented by a variable resistor 216. That is, such a weight change is performed only if the difference between the error signal generated during the previous cycle and the above defined error signal is greater than a threshold $\tau$ predetermined by the base threshold signal on input 283.

If the perturbation to sum signal 222 of the one of the neurons 210 currently addressed by counter 270 resulted in a significant change in $\Delta\epsilon$ signal 275 in comparison with signal 297, this counter is not incremented so that this neuron remains addressed and so that adjust period signal 265 is asserted. This signal 265 is provided to a buffer 310, which also receives signal 275 representing the change in the error of network 200 due to the perturbation which has just occurred at the addressed neuron, causing the level of the error change to be retained in this buffer for use during the adjust period. A multiplier 312 receives the retained $\Delta\epsilon$ signal from buffer 310 and the gain or G signal 296 and generates the product thereof as a signal provided to any suitable divider circuit 314 which also receives the perturbation or $\delta$ signal as a divisor for the product signal. Circuit 314 generates the correction signal K which is identified by numeral 315 and represents $-G(\Delta\epsilon/\delta)$. Signal 315 is thus inversely proportional to the perturbation of the addressed neuron, is directly proportional to a change in error $\epsilon$ caused by the provision of the perturbation to summing circuit 221 of this neuron, and is proportional to the gain factor. The change in error is, as previously described, the difference between error signal 241 as previously generated and as a trial error signal resulting from the perturbation, and the minus sign indicates that the correction signal is to be used so as to reduce the error. Signal 315 is provided to variation signal input 255 of network 200 through a switch 317 which is closed while adjust signal 265 is asserted.

When switch 317 is so closed, correction signal K indicated by numeral 315 is provided to the variation signal conductor 235 of the currently addressed neuron 210 through the one of the switches 257 corresponding to this conductor. This one switch 257 and conductor 235 thus serve, together with multiplexer 202 and counter 270, to address the weights or conductances represented by variable resistors 216 of a neuron 210 whose summing circuit 221 is similarly addressed by the other switch of the neuron under the control of such multiplexer and counter. The correction signal is provided through conductor 235 to every synapse 215 of this addressed neuron and, at each synapse, to multiplier 230 thereof at its input 232, this multiplier also receiving, at its input 231, the activation signal from the network 200 input 212 corresponding to the synapse. As a result, the weight of the synapse represented by variable resistor 216 is adjusted by a variation which is proportional to the level of the correction signal and corresponds, in ways subsequently explained in greater detail, to the activation signal. Since the weight adjustment is proportional to $\Delta\epsilon$, which is the previously described difference between error signal 241 as previously generated and as a trial error signal resulting from the perturbation, it is evident that this adjustment is determined by such difference.

When, as defined by adjust period signal 265, the adjustment of the weights 216 of the addressed neuron 210 is complete and the corresponding neuron outputs 211 exist, the error signal 241 determined by these outputs is saved, as before stated, by pulse 266 from controller 260 and the system of FIG. 4 proceeds to memory modification of the sequentially next one of the neurons 210.

It will be apparent that, when a circuit such as multiplier 230, which receives correction signal 315 and an activation signal from the corresponding input 212, provides an output, as to the associated setting circuit 233, proportional to the magnitudes of these signals, the weight of a synapse, such as a synapse 215, having the circuit is adjusted by a variation proportional to such magnitudes and each weight change is represented by $-G(\Delta\epsilon/\delta)I_j$. The weight changes are thus essentially the same as those determined by the steepest descent technique, that is, backpropagation in accordance with the delta rule discussed above in connection with FIG. 2. This is evident from the following mathematical presentation which uses symbolism different in some respects from that used above and in which "W" is a vector representing the weights of the synapses of an addressed neuron, "X" is a vector representing inputs to the neuron corresponding to the signals on inputs 212, "N" is a convergence parameter corresponding to gain G, "m" is a subscript identifying the currently addressed neuron, and "k" and "δ" are substantially as used above.

In such backpropagation, gradient descent is performed on the mean-square-error surface in weight space by the rule $$W_{k+1} = W_k - \mu \nabla_k$$

where $\nabla_k$ is the error gradient estimate in weight space based only upon information extracted by the current presentation for memory modification. If all of the weights in a artificial neural network are fixed and only those of neuron "m" are adjusted by backpropagation, $$\begin{aligned} W_{mk+1} &= W_{mk} - \mu \nabla_k \\ &= W_{mk} - \mu \frac{\partial \epsilon_k^2}{\partial W_{mk}} \\ &= W_{mk} - \mu \frac{\partial \epsilon_k^2}{\partial s_{mk}} \frac{\partial s_{mk}}{\partial W_{mk}} \end{aligned}$$

However, if a small perturbation δ is added to neuron "m"

$$\frac{\partial \epsilon_k^2}{\partial s_{mk}} \approx \frac{\Delta \epsilon_{mk}^2}{\Delta s_{mk}} = \frac{\epsilon_{mk}}{\delta}$$

Therefore, $$\begin{aligned} W_{mk+1} &\approx W_{mk} - \mu \left(\frac{\epsilon_{mk}}{\delta}\right) \frac{\partial s_{mk}}{\partial W_{mk}} \\ &= W_{mk} - \mu \left(\frac{\epsilon_{mk}}{\delta}\right) \frac{\partial W_{mk}^T X_{mk}}{\partial W_{mk}} \\ &= W_{mk} - \mu \left(\frac{\epsilon_{mk}}{\delta}\right) X_{mk} \end{aligned}$$

which is equivalent to the rule set forth above for the present invention as embodied with each resistor 216 being adjusted by a variation represented by $-G(\Delta\epsilon/\delta)I_j$.

However, the present invention may also be embodied in elements or a method wherein a function, which corresponds to that of multiplier 230 of a synapse 215 in receiving a factor corresponding to correction signal 315 and thus proportional to $G(\Delta\epsilon/\delta)$ and in receiving the activation signal from the network 200 input 212 corresponding to the synapse to provide an adjustment for the weight of the synapse where the adjustment corresponds to such an activation signal having values corresponding to opposite mathematical signs thereof, is independent of the magnitude of the activation signal but is in a direction determined by the sign of the activation signal and is also proportional to such a factor corresponding to correction signal 315. This technique is effective in the initial cycles of memory modification where the initial values of the weights are likely to be such that the output of the function generators, such as function generators 225, is at the upper bound 227 or lower bound 228. It is apparent that memory modification in accordance with the present invention may, initially, depend only on the signs of the activation signals and, subsequently, depend also on the magnitude of the activation signals.

The present invention has heretofore been described as if the trial error signal, which corresponds to error signal 241 from error calculator 201 when the output of a neuron 210 has been perturbed by application of a signal to summing junction 221 thereof, is less than a previously derived such error signal 241, the error signal being scalar in both cases since it is derived from absolute values representing differences between each of the neuron output signals 211 and the corresponding one of the desired output signals 240. It is apparent, however, that the perturbation may be such that the trial error signal level may be increased by the perturbation. In this event and as a feature of the present invention, the synapse weights represented by resistors 216 are adjusted, but in a direction opposite to that in which the weights would be adjusted when the previously generated error signal is greater than the trial error signal, the magnitude of the adjustment in both cases being proportional to the absolute magnitude of the difference between such error signals. This feature may be implemented in a digital computer, which performs the functions of elements of FIG. 4 and is programmed in accordance with FIG. 5, retain the signs as values corresponding to the symbols Δε and K are calculated. With elements as shown in FIG. 4, this feature may be implemented with any suitable circuits, which are believed well-known to those skilled in the art and function with signals corresponding to these symbols and indicated by numerals 275 and 315, to provide values of these signals corresponding to opposite mathematical signs, such circuits serving as multipliers 312 and 230 and divide circuit 314 being adapted to use these signs in the usual algebraic manner and such circuits corresponding to setting circuits 233 being adapted to appropriately increase or decrease the conductances of the synapses such as synapses 215.

It is apparent that, in a neural network system corresponding to FIG. 4 and adapted for use with signals or digital values representing signed magnitudes as set forth in the previous paragraph, the output signals 211, the desired output signals 240, and the input signals 212 may have corresponding signed magnitude levels. Error signal 241 may, as earlier described, be a LMS or other signal derived from the absolute magnitude of the differences between corresponding pairs of signals 211 and 240. The previous paragraph also described the generation of the correction or K signal 315 by determining the change in error or Δε signal 275 as a signed magnitude having a sign which is defined by the direction of this change when a perturbation δ is provided to a summing circuit 221 addressed by multiplexer 202 and counter 270. With such signed magnitude signals, it is apparent that the adjusting of a conductance represented by a similarly addressed variable resistor 216 includes determining the variation in such conductance as having a sign which defines the direction of such adjusting and is determined by the sign of the error change $\Delta\epsilon$ and the sign of the activation signal on the input 212 corresponding to the conductance.

Two other features of the present invention have been described with reference to FIG. 4, but will be now be described in greater detail. These features are not required in the practice of the invention, but expedite and facilitate convergence of artificial neural network memory modification by the invention. The first such feature involves the gain signal or factor "G" indicated by numeral 296 generated by multiplier 291 being proportional to a base gain, as provided at input 282, and to the error signal $\epsilon$ indicated by numeral 241. As such convergence is attained, the error decreases by definition so that the gain factor diminishes correspondingly. As a result, the adjustments to the weights of synapses 215 are relatively large initially to expedite convergence, but subsequently decrease with the error signal to provide maximum resolution in determining the weight values and to avoid possible problems with local minima. The second and related feature similarly expedites convergence, provides maximum resolution, and avoids local minima by generating perturbation signal $\delta$, which is indicated by numeral 295, by multiplier 290 as proportional to a base perturbation signal provided at input 281 and the error signal 241. The error signal provided to either or both of the multipliers 290 and 291 may, of course, be an error signal corresponding to that retained in buffer 272.

Figure 2:
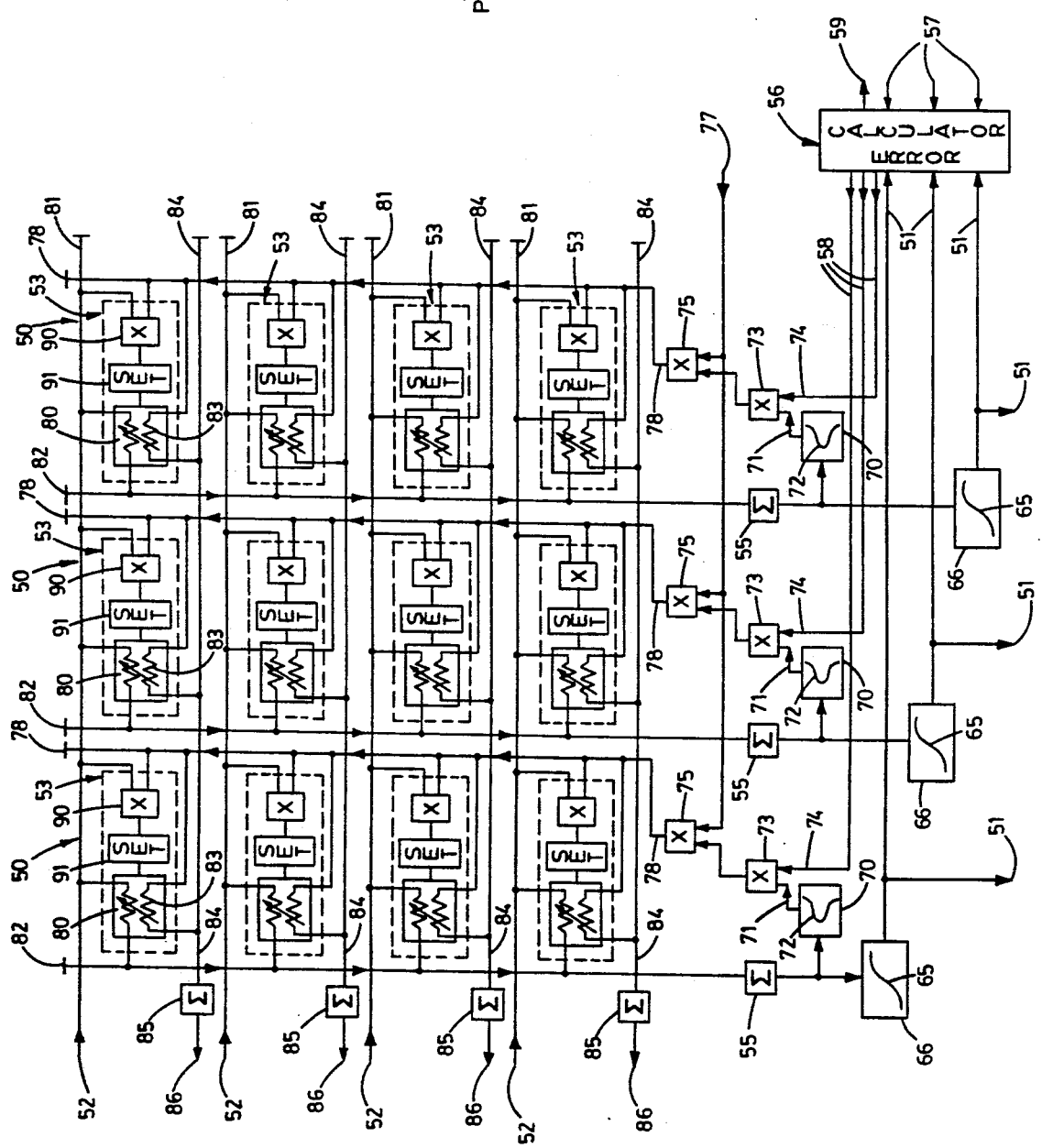
FIG. 2 is a block diagram of an artificial neural network system adapted for memory modification by the prior art delta rule method.

It is apparent from comparison of FIG. 4, which shows an artificial neural network system embodying the present invention, with FIGS. 2 and 3, which show systems implementing the prior art, that the FIG. 4 system is simpler than the FIG. 3 Madeline system in not requiring elements typified by the buffers 170 and 175 with the associated counter 165 and related elements for searching for the neuron 100 nearest to transition and is, in particular, simpler than the FIG. 2 delta rule system in not requiring the multiplicity of error backpropagation elements such as function generators 72, variable conductances 83, and summing circuits 85 with their associated conductors 81 and 84 and other elements. A system embodying the present invention is, as discussed above, believed highly advantageous in relation to a Made line system in that a system of the present invention provides substantially more effective artificial neural network memory modification for the recognition of complex patterns. In regard to such a delta rule system, the present invention is highly advantageous, not only because it eliminates the bulky and power consuming backpropagation elements which were pointed immediately above and limit the number of neurons which can be constructed on a VLSIC chip, but because the present invention provides the effective memory modification of the steepest descent technique without the need, as seen in FIG. 2, for paralleling between artificial neural network layers forward propagation conductors such as 81 with error backpropagation conductors such as 86 and for paralleling within a layer forward and backpropagation conductor pairs such as such as conductors 81 and 84 and 80 and 78. The present invention thus eliminates any difficulties due to crosstalk between such paralleled conductors.

The advantage provided by the present invention is, however, more general than in just avoiding crosstalk during backpropagation because the present invention does not require backpropagation of error signals at all. The correction signal "K" provided to neurons, such as neurons 210 of the FIG. 4 system of the present invention, by conductors such as those indicated at numerals 295 and 235, may have a relatively high level since it represents a weight change rather than an error level and any crosstalk which might occur would not introduce an error into the error measurement itself. Further, crosstalk between correction conductors 235 and summing conductors 218 is immaterial because weight adjustment in response to signal 265, when the correction conductors are active, need not occur during perturbation when the summing conductors are active in response to signal 264. An artificial neural network system embodying memory modification in accordance with the present invention has the even more general advantage in that memory modification is based on the local parameters of an actual network rather than on theoretical or design parameters which may not correspond to the working parameters of a VLSIC or other circuit forming the network in which circuits may be completely inoperative, operate deficiently, or have properties varying with location on a chip. Memory modification in accordance with the present invention is also advantageous in being cyclic with the weights of one neuron only being adjusted during a cycle so that time varying errors or theoretically improper adjustments to the weight of a synapse or the weights of a neuron are corrected in a subsequent cycle.

Having pointed out these advantages, a method embodying the present invention in accordance with the flow chart of FIG. 5 will now be briefly described with reference to this flow chart and to FIG. 4. On entry initialization is performed, as indicated in block 400, to the desired or final error $\epsilon_d$, and the initial neuron to be perturbed. A cycle is then begun by obtaining the current error $\epsilon$ and saving it as $\epsilon_k$, operations indicated in blocks 402 and 403. These operations, which correspond to reception of signal 241 and to loading buffer 272 in FIG. 5, may also be may be considered as terminating a subsequent cycle. The retained error is then compared with the desired error and memory modification is complete if the desired error is attained; this comparison is indicated in block 405 and corresponds to the function of comparator 286 of FIG. 4. The values to be use for perturbation, error change threshold, and gain are then calculated as indicated in block 407 and as functions of $\epsilon_k$. These calculations correspond, respectively, to those of multipliers 290, 292, and 291 of FIG. 4 and may involve other variables than the retained error signal as indicated in FIG. 5 or the current error as indicated in FIG. 4. These calculations may be more complex than simply multiplication as suggested in FIG. 4.

Selection of the next neuron to be perturbed is then performed as indicated by decision block 410 and by block 411 or reinitialization block 412, this selection corresponding to increment of FIG. 4 counter 270 by signal 263 and the resulting closing of switches 257 of the neuron. As before stated, the next neuron need not be determined by repeatedly incrementing a numeric address by unity, and block 411 thus indicates only that a "next neuron" is to be selected As indicated by block 415, the selected neuron is then perturbed by outputting the predetermined perturbation $\delta$ in any suitable manner so as to affect the output of a summing circuit, such as a circuit 221 of FIG. 4, of the selected neuron. This operation corresponds to closing of the FIG. 4 switch 300 and is followed by input, indicated by block 417, of the error as affected by the perturbation. The change in error, delta error or $\Delta\epsilon$, is then determined as indicated by block 418. In FIG. 4, the corresponding error change is determined by circuit 274 and is indicated by numeral 275.

This error change is then compared, as indicated in decision block 420, with the error change threshold $\tau$ and if, the perturbation of the currently selected neuron has not resulted in a change greater than this threshold, no adjustment is made to the weights of this neuron and the method skips to the blocks 410–412 selection of the next neuron, these operations corresponding to the FIG. 4 functions of comparator 305 and skip terminal 268 of controller 260. When the error change is auspicious, the correction K, which corresponds to signal 315 and represents the negative of the product of the gain and error change divided by the perturbation, is calculated as indicated by block 422 and output to the currently selected neuron as indicated by block 424. The calculation of block 422 is that represented by multiplier 312 and divider 314 in FIG. 4, and the output represented by block 424 is performed in FIG. 4 by switch 317 and the one of the switch switches 257 associated with the variation conductor 235 of the one of the neurons 210 addressed by counter 270 and multiplexer 202.

At this one of the neurons, the weight of each synapse is adjusted, as indicated by a block 430, by an amount $\Delta w_{ij}$ equal to the product of K and the activation $I_j$ of the synapse, operations corresponding to the functions of a setting circuit 233 and a multiplier 235 in FIG. 4. It is apparent that, as a result of these operations and expressed mathematically, $w_{ij}^{(k+1)} = w_{ij}^{(k)} + \Delta w_{ij}^{(k)}$. Block 430 is depicted in FIG. 5 as within a loop defined conventionally by blocks 432–434 for addressing each synapse in a neuron, an operation not required by the system represented in FIG. 4, but corresponding to performance of a method embodying the present invention digitally by a computer having outputs constructed so as to address each synapse of an associated artificial neural network.

When the weights of each synapse of the neuron have been so adjusted, the method proceeds back to block 402 to begin another cycle of memory modification of an artificial neural network in accordance with the present invention.

Obviously, many modifications and variations of the present invention are possible in light of the above teachings. It is, therefore, to be understood that the invention may be practiced within the scope of the following claims other than as specifically described herein.

What is claimed is:

1. A memory modification method for use with an artificial neural network having:
    a plurality of inputs, each input providing a corresponding input signal; and
    a plurality of neurons having
        a plurality of synapses individually corresponding to said inputs, each synapse having means for storing a weight individual to the synapse and having means for generating a synapse output signal representing the product of said weight and the input signal corresponding to the synapse,
        means for generating a sum signal representing the sum of every synapse output signal of said plurality of synapses, and
        means for generating a neuron output signal determined by a predetermined function of said sum signal,
    and with teaching means for:
    receiving every neuron output signal from said plurality of neurons;
    generating an error signal representing the sum of the differences between every neuron output signal and a desired output signal corresponding thereto;
    changing selectively said weights of said synapses of each of said plurality of neurons; and changing selectively every sum signal of said plurality of neurons,
    the memory modification method comprising:
    said function being a differentiable function, and
    the method including the steps of:
        changing successively and by a predetermined perturbation every sum signal of said plurality of neurons;
        generating a trial such error signal when said sum signal of each one of said neurons is changed by said predetermined perturbation and such weights are the weights resulting in a previously generated such error signal generated when the sum signal of said one of said neurons is not changed by said predetermined perturbation; and
        changing the weight of every synapse of said one neuron by an adjustment determined by the difference between said previously generated error signal and said trial error signal.

2. The memory modification method of claim 1 wherein said differentiable function is monotonically nondecreasing.

3. The memory modification method of claim 1 wherein, at each synapse of said one neuron, said adjustment
    is proportional to the difference between said previously generated error signal and said trial error signal,
    is proportional to said perturbation, and
    is in a direction determined by the input signal provided by the one of said inputs corresponding to the synapse.

4. The memory modification method of claim 3 wherein said input signal provided by the one of said inputs corresponding to the synapse is a signed signal and wherein said direction is determined by the sign of said signal.

5. The memory modification method of claim 3 wherein said adjustment is also proportional to the input signal provided by the input corresponding to the synapse.

6. The memory modification method of claim 1 wherein said adjustment is in one direction when said previously generated error signal is greater than said trial error signal and is in the opposite direction when said previously generated error signal is less than said trial error signal.

7. The memory modification method of claim 1 wherein said adjustment is proportional to a gain factor which is decreased as such an error signal decreases.

8. The memory modification method of claim 1 wherein said error signal is determined by the sum of the squares of the differences between every neuron output signal and the corresponding desired output signal.

9. The memory modification method of claim 1 wherein said perturbation is proportional to such an error signal.

10. The memory modification method of claim 1 wherein the method further comprises changing the weight of every synapse of said one neuron by said adjustment only if the difference between said previously generated error signal and said trial error signal is greater than a predetermined threshold difference.

* * * * *